Oct. 21, 1969     J. FAJANS ET AL     3,473,401
DEVICE FOR MEASURING PAPER STOCK CONSISTENCY
Filed April 6, 1966
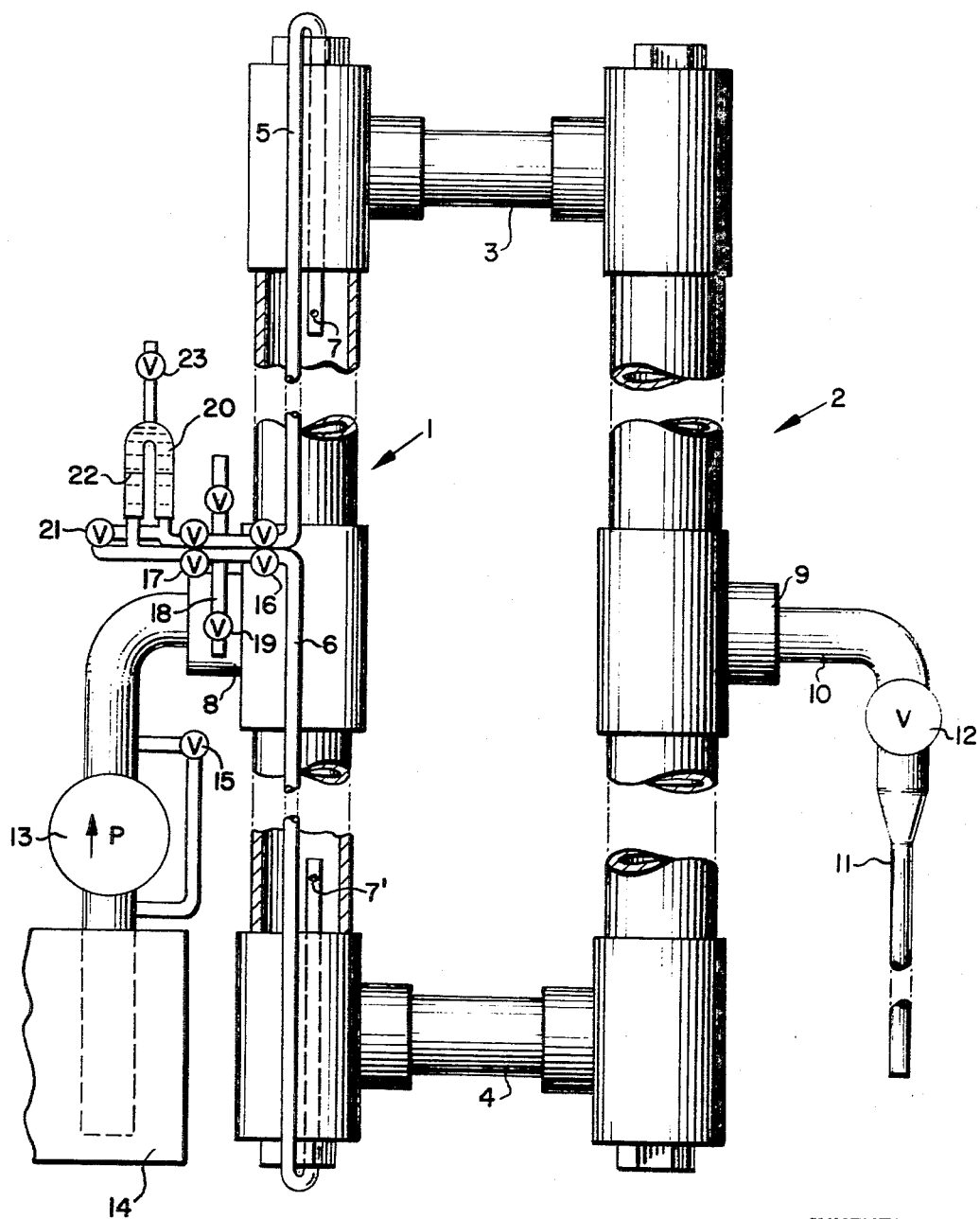
INVENTORS.
JACK FAJANS
JOHN E. NANKIVELL
BY: *Kelman and Berman*
AGENTS United States Patent Office 3,473,401
Patented Oct. 21, 1969

3,473,401
DEVICE FOR MEASURING PAPER STOCK
CONSISTENCY
Jack Fajans, 1133 Magnolia Road, Teaneck, N.J. 07666,
and John E. Nankivell, 30 Riverside Drive, Florham
Park, N.J. 07932
Filed Apr. 6, 1966, Ser. No. 540,690
Int. Cl. G01n 9/12
U.S. Cl. 73—438                                    8 Claims

ABSTRACT OF THE DISCLOSURE

A densitometer for paper stock has a wide, vertical metal pipe with a central inlet. Two restricted nozzles in the pipe are equidistant from the inlet in opposite vertical directions and connected to the two leg ends of an inverted U-tube by narrow copper tubes soldered to the outside of the wide tube and to each other for heat transfer. A pump drives the measured stock through the inlet and from both ends of the pipe through a common outlet restricted to maintain high pressure in the system. Water fills the copper tubing, and ethylbenzene the U-tube.

---

This invention relates to specific gravity measurement, and particularly to a device for precisely measuring the specific gravity of a suspension of solids in a continuous liquid phase. In its more specific aspects, the invention is concerned with measuring the consistency of aqueous paper stock by determination of the specific gravity of the stock.

The term "paper stock" will be understood to define a suspension of fibers in a liquid carrier. Cellulose fibers suspended in water constitute most paper stock, but the invention is not limited to specific fibers nor to specific carriers, and it will be apparent that the device of the invention has utility beyond the measurement of paper stock consistency.

The object of the invention is the provision of a device of sufficient precision to permit the determination of consistency in a stock mainly consisting of 0.5% cellulose fibers and water to ±2% of the fiber content by specific gravity measurements.

The only practical method available at this time for precisely determining stock consistency involves the evaporation of a stock sample to dryness and weighing of the residue. This method is so time-consuming that its results cannot usually be employed for maintaining reasonably uniform stock consistency on a high-speed paper making machine.

It is therefore another object of the invention to provide a device which indicates stock consistency continuously without significant time lag, and which yields data of highest precision with a time lag of not more than a few minutes.

The true specific gravity of fibers mainly consisting of cellulose is approximately 1.5, and the specific gravity of paper stocks differing from a nominal consistency of 0.5% sufficiently to affect the quality of the paper made from the stock in a most serious manner differs from that of stock having the proper consistency only by a very small fraction of one percent. Although numerous attempts have been made to devise a sufficiently sensitive and reliable instrument for measuring the minute differences in specific gravity, an operative device could not be built heretofore.

Thermal expansion and contraction of the stock, air bubbles adhering to the fibers, differences in composition between the measured sample and the bulk of the stock, uncontrollable internal and external friction effects, and the problem of converting the differences of specific gravity into perceptible signals have been the principal sources of failure.

We have overcome the difficulties mentioned above in a device whose operative elements mainly consist of a container adapted to hold the paper stock, two restricted nozzles which are vertically spaced in the container in the normal operating condition of the device, and two conduits which respectively lead from the nozzles to a differential pressure indicator.

The exact nature of this invention as well as other objects and advantages thereof will be readily apparent from consideration of the following specification relating to the annexed drawing in which the sole figure shows an embodiment of the invention in fragmentary elevation, and partly in section.

The main container of the device is assembled from standard galvanized 2" steel pipes and corresponding T-fittings in the shape of a vertically elongated rectangle. The two vertical legs 1, 2 of the rectangle are connected by transverse pipe sections 3, 4 near the plugged top and bottom ends of the legs 1, 2. Two lengths 5, 6 of ¼" copper tubing extend longitudinally into the top and bottom of the leg 1 through the respective plugs and past the orifices of the transverse sections 3, 4. Their ends are longitudinally closed and provided with radial bores 7, 7' to provide restricted nozzles for horizontal fluid flow between the leg 1 and the copper tubing.

T-fittings 8, 9 are arranged in the legs 1, 2 to form an inlet in the leg 1 which is precisely centered between the nozzles 7, 7' and an outlet in the leg 2 on the same level as the inlet 8. A discharge pipe 10 connected with the outlet 9 has a long section 11 of ¼" internal diameter, the purpose of which will presently become apparent, and a shut-off valve 12.

The inlet 8 is connected with a stock tank 14 by a pump 13. The pump, not shown in detail, is a screw pump of the type illustrated in Perry's Chemical Engineers' Handbook, 4th ed., pages 6–12 (Moyno pump). A throttle valve 15 controls a by-pass around the pump 13.

Vertical portions of the copper tubes 5, 6 are soldered to the outer surface of the leg 1. The tubes extend toward each other and then horizontally away from the container. Their ends are bent upward and connected by an inverted U-tube 20 of glass. Two valves 16, 17 are provided in each horizontal run of the tubes 5, 6, and side tubes 18 on the horizontal runs between the valves 16, 17 are equipped with valves 19. The horizontal runs of copper tubing are soldered to each other. Their ends near the U-tube 20 are connected by a valve 21. A valve 23 normally closes a filling nipple on the U-tube 20.

In normal operation of the apparatus described, paper stock fills the pump 13, the main container and the connecting pipes and valves. It is in pressure-transmitting contact at the nozzles 7, 7' with water which fills the two copper tubes 5, 6 to respective interfaces 22 with a body of ethylbenzene in the bight portion of the U-tube 20. The apparatus is first filled with water through the valves 19 while air is permitted to escape through the valve 23 and the top end of the leg 2 which is opened for the purpose. Water is then drained from the U-tube 20 through the valve 19 while the open valve 23 is connected to a vessel filled with ethylbenzene, and the water in the main container is ultimately displaced by paper stock which is pumped through the main container and the restricted outlet pipe 11 by the pump 13.

The flow resistance of the pipe section 11 and the rate of delivery of the pump 13 are selected in such a manner as to maintain a pressure of about 150 pounds per square inch in the liquid filled apparatus when the valves 12, 16, 17 are open and all other valves are closed. The solder joints, not visible in the drawing, which connect the vertical portions of the copper tubes 5, 6 to the steel pipe and T-fititngs of the leg 1, and which connect the horizontal runs of copper tubing to each other are so heavy that heat exchange between the fluids prevents temperature differences of more than 0.5° F. in the conduits which are connected by the solder.

The stream of stock which enters the main container through the inlet 8 is divided into two equal branches which flow in opposite direcitons in the legs 1, 2 and are ultimately jointly discharged through the outlet 9 and the restricted tubing section 11. The frictional effects in the two branches of the stock stream balance each other. The high pressure maintained in the apparatus favors the dissolution of air bubbles introduced with the stock, or at least their compression to an insignificant volume.

The vertical spacing of the inlet 8 from the horizontal runs of the copper tubes 5, 6 has been enlarged in the drawing for the sake of clearer pictorial representation. It is preferably of negligible magnitude as compared to the spacing of the nozzles 7, 7' which is about ten feet.

The interfaces 22 are on a common level if the main container is filled with a liquid having the same specific gravity as the liquid which fills the copper tubes 5, 6, and the drawing illustrates the interfaces 22 in this condition of the apparatus. It can readily be calculated that the vertical spacing of the two interfaces 22 in the illustrated apparatus is about 3.5 centimeters when the main container is filled with paper stock consisting of water and 0.5% cellulose while the copper tubing is filled with water. A change in consistency by 0.01% cellulose (2%) results in a change of about 0.07 centimeters which can readily be read with a magnifying glass, and even more precisely with a cathetometer. The combined effects of temperature variation, residual gas bubbles, and internal friction in the flowing liquid are substantially smaller.

In actual practice, we prefer empirically to calibrate our device. A chart of stock consistency versus vertical spacing of the interfaces 22 on rectangular graph paper is a straight line passing through the origin of the coordinates. The device may therefore be calibrated by a single measurement performed on stock of known consistency if the water used as a comparison standard is the same water that is being employed for preparing the stock. Two calibration measurements are necessary if this condition is not met.

The consistency values determined by our device have been found not to be affected by changes in the temperature of the stock as rapid as 1° C. per minute, nor by normal changes in ambient temperature to which the apparatus may be exposed. Lagging or other thermal insulation is entirely unnecessary.

The rate of liquid flow through the nozzles 7, 7' is very small so that mixing of the stock with the water employed as a comparison standard is negligible over long periods of operation. An instrument substantially identical with that illustrated has been operated continuously for several weeks without significant loss of accuracy. The readings ultimately may become erratic if deposits of fibers in the main container become heavy enough to affect flow properties of the apparatus in a manner not compensated for by the symmetrical flow pattern. It is then necessary to flush the apparatus with water, and such an operation is quickly and simply performed, using the illustrated valves in an obvious manner.

Deviations from the desired nominal stock consistency even smaller than 2% can be measured accurately when the apparatus is filled with a stagnant body of paper stock. The valve 12 is closed, and the valve 15 is opened only sufficiently to maintain a pressure differential of at least 100 lbs./sq. in. between the intake and the discharge pipe of the pump 13. The settling velocity of the fibers in conventional paper stock is too small to affect the specific gravity readings within the few minutes needed for establishing stable positions of the interfaces 22. Twelve individual measurements are readily made within one hour. The valve 12 is opened and the valves 16 or 17 are closed between measurements.

The pressure to be maintained in the main container of the afore-described apparatus depends on the volume of the air bubbles introduced with the stock and on the required accuracy of the measurements. If air bubbles are present in an amount interfering with the measurements, significant improvement requires a gage pressure of at least ten pounds per square inch to be maintained in the apparatus, but it is simplest to maintain a minimum pressure of 100 p.s.i. to guard against erratic readings.

Obviously, many variations and modifications of the afore-described illustrated apparatus are possible without losing the major benefits of this invention. It is not necessary, for example, to connect to the two transverse pipe sections 3, 4 with a second longitudinal leg 2 and a common outlet 9, if maximum accuracy is not required. The pipe sections 3, 4 may serve as separate outlets of the apparatus and may discharge the paper stock through respective throttling devices corresponding to the tubing section 11.

The illustrated U-tube may be replaced by a different set of communicating, tubular, vertically extending legs, and it will be understood that the term U-tube is intended to cover such variations. Ethylbenzene has been found to be a very desirable filling for the U-tube because of the difference between its specific gravity and that of water, and because of the mutual insolubility of these liquids at ordinary atmospheric temperatures, but castor oil and the like may also be used.

Various other modifications are contemplated and may obviously be resorted to without departing from the spirit and scope of the invention as set forth in the appended claims.

What we claim is:

1. In a device for measuring the specific gravity of a suspension of a solid in a continuous liquid phase, in combination:
   (a) a container adapted to contain a body of said suspension, said container having
      (1) an inlet, and
      (2) two outlets communicating with the ambient atmosphere;
   (b) two restricted nozzles vertically substantially equidistant in said container from said inlet in opposite vertical directions in the normal operating condition of said device,
      (1) said outlets being spaced from respective ones of said nozzles in a direction away from said inlet;
   (c) pump means for driving the suspension to be measured into said container through said inlet;
   (d) pressure holding means for holding the pressure of said suspension between said nozzles at least ten pounds per square inch higher than the pressure of said atmosphere when said suspension is driven into said container by said pump means;
   (e) two conduits respectively communicating with said nozzles and having respective portions spaced from said nozzles; and
   (f) differential pressure indicating means for indicating the difference of liquid pressure in said portions of said conduits.

2. In a device as set forth in claim 1 said pressure holding means maintaining a pressure higher than atmospheric pressure by at least one hundred pounds per square inch in every portion of said container and of said conduits.

3. In a device as set forth in claim 1, said conduits jointly constituting a conduit system interposed between said nozzles and said indicating means, said system including a plurality of conduit portions jointly extending over substantially the entire vertical spacing of said nozzles; and connecting means connecting each of said portions of the conduits system with a vertically coextensive portion of said container for heat exchange between a fluid in said conduit portion and a corresponding portion of said body in said coextensive container portion.

4. In a device as set forth in claim 3, said container and said conduit portions being tubular metal elements, said connecting means connecting said elements in metal-to-metal contact.

5. In a device as set forth in claim 1, a body of pressure-transmitting liquid filling said conduits, said indicating means including a U-tube having two communicating vertically extending legs respectively connected to terminal portions of said two conduits, and an indicating fluid in said U-tube in contact with the pressure-transmitting liquid in said conduits, the specific gravity of said pressure transmitting liquid being different from the specific gravity of said indicating fluid, said indicating fluid and pressure-transmitting liquid being substantially insoluble in each other.

6. In a device as set forth in claim 1, each of said nozzles being closed in a direction toward the other nozzle, and formed with an opening for liquid flow therethrough in a horizontal direction.

7. A method of measuring the specific gravity of a material including a continuous liquid phase which comprises:

(a) causing said material to flow in a continuous stream;
(b) dividing said stream at a predetermined point into two branches of equal flow velocity and directing said branches in opposite vertically extending directions;
(c) sensing the difference in pressure prevailing in respective portions of said branches equidistant from said point; and
(d) generating a signal responsive to the difference of the sensed pressures.

8. A method as set forth in claim 1, which further comprises maintaining said stream and said branches at a pressure not substantially smaller than 100 pounds per square inch.

References Cited
UNITED STATES PATENTS

| | | | |
|---|---|---|---|
| 2,838,927 | 6/1958 | Gray | 73—30 |
| 2,279,254 | 4/1942 | Irwin | 73—438 |
| 2,728,219 | 12/1955 | Martin | 73—30 |
| 2,949,027 | 8/1960 | Eolkin | 73—32 |

RICHARD C. QUEISSER, Primary Examiner

JOHN K. LUNSFORD, Assistant Examiner